(12) United States Patent
Killeen et al.

(10) Patent No.: US 12,423,254 B2
(45) Date of Patent: Sep. 23, 2025

(54) INTERRUPT LATENCY RESILIENT UART DRIVER

(71) Applicant: Silicon Laboratories Inc., Austin, TX (US)

(72) Inventors: Francois Killeen, Laval (CA); Alexandre Autotte Portelance, St-Hubert (CA); Yacin Belmihoub-Martel, Montréal (CA); Issam Maghni, Saint-Léonard (CA); Jean Francois Deschenes, Ste-Marthe-sur-le-lac (CA); Simon Beaudoin, Beloeil (CA)

(73) Assignee: Silicon Laboratories Inc., Austin, TX (US)

( * ) Notice: Subject to any disclaimer, the term of this patent is extended or adjusted under 35 U.S.C. 154(b) by 5 days.

(21) Appl. No.: 18/235,071

(22) Filed: Aug. 17, 2023

(65) Prior Publication Data

US 2025/0061073 A1 Feb. 20, 2025

(51) Int. Cl.
*G06F 13/28* (2006.01)
*G06F 13/16* (2006.01)

(52) U.S. Cl.
CPC .......... *G06F 13/28* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 11,494,326 B1* | 11/2022 | Xu | ............................ | G06N 3/06 |
| 2003/0099254 A1* | 5/2003 | Richter | .................... | H04L 45/00 |
| | | | | 370/352 |
| 2003/0188054 A1* | 10/2003 | Yosimoto | ................. | G06F 13/28 |
| | | | | 710/22 |
| 2007/0162637 A1* | 7/2007 | Mirabeau | ................. | G06F 13/28 |
| | | | | 710/22 |
| 2009/0031055 A1* | 1/2009 | Archer | .............. | G06F 15/17337 |
| | | | | 710/24 |
| 2010/0131680 A1* | 5/2010 | Go | ........................... | G06F 13/28 |
| | | | | 710/26 |
| 2017/0147517 A1* | 5/2017 | Chen | .................... | G06F 13/4282 |
| 2019/0172537 A1* | 6/2019 | Peddle | ................. | G06F 12/0246 |
| 2021/0157754 A1* | 5/2021 | Motzko | ................. | G06F 13/122 |

* cited by examiner

*Primary Examiner* — Michael Sun
(74) *Attorney, Agent, or Firm* — Nields, Lemack & Frame, LLC

(57) ABSTRACT

A system and method of reducing data loss in a system utilizing a bus protocol that does not support flow control is disclosed. The peripheral device utilizes a spill buffer which is used to capture any data sent by the host before the peripheral device is able to properly configure the DMA controller. Additionally, the peripheral device includes a recovery routine, which is a software program that parses the spill buffer and extracts any headers or payloads that are contained therein. Using the spill buffer and recovery routine, the baud rate of the bus interface may be increases without incurring any increase in data loss.

16 Claims, 7 Drawing Sheets

INTERRUPT LATENCY RESILIENT UART DRIVER

FIELD

This disclosure describes a system and method to deliver packets between a host and a device using the Universal Asynchronous Receive Transmit (UART) protocol.

BACKGROUND

The Universal Asynchronous Receive/Transmit (UART) communication interface is one of many wired interfaces that are currently in use. The UART interface is a wired bus that includes 2 signals in its standard form. There is a transmit signal and a receive signal. All data is transmitted asynchronously, wherein the clock signal is extracted from the transmitted data. There are various standard baud rates, which include 9600, 19200, 38400, 57600, 115200, 230400, 460800, 921600, 1000000 and 1500000 bits per second. Baud rate indicates the number of bits that the host may transmit in one second.

In operation, there is no flow control. Thus, the host is free to send data at anytime and the peripheral device cannot throttle the host. Additionally, the UART specification allows flexibility in the structure and meaning of the bytes that are transmitted. In certain embodiments, each transaction begins with the transmission of a header, which may be 7 bytes in length. The header may include the length of the payload, in bytes, which the host will send, as well as an error detection or correction code.

In this embodiment, after transmission of the header, the host then transmits the payload, wherein the number of bytes to be transmitted were defined in the header.

This protocol is effective but may be susceptible to various issues. For example, the peripheral device may have limited resources, such as, for example, a single processor and a single receive direct memory access (DMA) controller. In the sequence described above, the peripheral device must receive the header, ensure that the CRC is correct and then set up the receive DMA controller to receive the number of bytes that were specified in the header. Note, as well, that since there is only a single processor, it is also possible that the processor is servicing another higher priority task when the header is received. Thus, it is possible that the host may begin transmitting the payload before the peripheral device has configured the receive DMA controller. This may result in lost data.

One approach to address this issue is to use a low baud rate. This provides the peripheral device more time between bytes to set up the required DMA operations. However, it is still possible that the peripheral device is unable to configure the DMA controller, even at low baud rates. Further, this approach reduces the throughput of the data that is transmitted to the peripheral device.

Therefore, it would be beneficial if there was a driver and associated software on the peripheral that minimizes the possibility of lost data. Furthermore, it would be advantageous if the new driver allowed a greater baud rate to be utilized.

SUMMARY

A system and method of reducing data loss in a system utilizing a bus protocol that does not support flow control is disclosed. The peripheral device utilizes a spill buffer which is used to capture any data sent by the host before the peripheral device is able to properly configure the DMA controller. Additionally, the peripheral device includes a recovery routine, which is a software program that parses the spill buffer and extracts any headers or payloads that are contained therein. Using the spill buffer and recovery routine, the baud rate of the bus interface may be increased without incurring any increase in data loss.

According to one embodiment, a peripheral device to receive data from a host with no flow control, wherein the data comprises a plurality of headers and payloads, is disclosed. The peripheral device comprises a processing unit; a memory device; and a DMA controller, wherein the peripheral device configures the DMA controller to receive a header or a payload and uses an active buffer disposed in the memory device to store the header or payload sent to the peripheral device; and uses a spill buffer to capture additional headers and payloads transmitted before the DMA controller is properly configured to receive the additional headers and payloads. In certain embodiments, the DMA controller comprises a linking DMA controller, such that there are a plurality of buffer descriptors disposed in the memory device, each buffer descriptor comprising an address of a buffer to store received data, a byte count and an address of a next buffer descriptor to use when the DMA controller has received a number of bytes equal to the byte count. In some embodiments, an active buffer descriptor is used by the peripheral device to identify the active buffer, and the active buffer descriptor comprises an address of a spill buffer descriptor as the address of the next buffer descriptor, and the spill buffer descriptor comprises the address of the spill buffer. In some embodiments, the peripheral device uses an interrupt service routine, which is executed after the DMA controller receives the number of bytes defined in the byte count. In some embodiments, the header comprises a CRC and a length field that defines a length of an associated payload; and the interrupt service routine, after receiving the header, checks a validity of the CRC, and if valid, configures the DMA controller to receive a payload having a number of bytes defined in the length field. In some embodiments, the interrupt service routine, after receiving the payload, passes the active buffer to higher level software, and configures the DMA controller to receive a next header. In some embodiments, the interrupt service routine, after receiving the header or payload, checks if additional data has been received, and if so, dispatches a recovery routine. In some embodiments, the peripheral device executes the recovery routine, different from the interrupt service routine, when data is written to the spill buffer to extract headers and/or payloads in the spill buffer and pass them to higher level software. In some embodiments, the interrupt service routine processes data in the active buffer and the recovery routine only processes data in the spill buffer.

According to another embodiment, a method of receiving data with no flow control, wherein the data comprises a plurality of headers and payloads, using a DMA controller is disclosed. The method comprises configuring the DMA controller to receive a header or a payload and using an active buffer to store the header or payload; and using a spill buffer to capture additional headers and payloads transmitted before the DMA controller is properly configured to receive the additional headers and payloads. In some embodiments, the DMA controller comprises a linking DMA controller, such that there are a plurality of buffer descriptors, each buffer descriptor comprising an address of a buffer to store received data, a byte count and an address of a next buffer descriptor to use when the DMA controller has received a number of bytes equal to the byte count. In some embodiments, an active buffer descriptor is used to identify the active buffer, and wherein the active buffer descriptor comprises an address of a spill buffer descriptor as the address of the next buffer descriptor, and wherein the spill buffer descriptor comprises the address of the spill buffer. In some embodiments, an interrupt service routine is executed after the DMA controller receives the number of bytes defined in the byte count. In some embodiments, the header comprises a CRC and a length field that defines a length of an associated payload; and the interrupt service routine, after receiving the header, checks a validity of the CRC, and if valid, configures the DMA controller to receive a payload having a number of bytes defined in the length field. In some embodiments, the interrupt service routine, after receiving the payload, passes the active buffer to higher level software, and configures the DMA controller to receive a next header. In some embodiments, the interrupt service routine, after receiving the header or payload, checks if additional data has been received, and if so, dispatches a recovery routine. In some embodiments, the recovery routine, different from the interrupt service routine, is executed when data is written to the spill buffer to extract headers and/or payloads in the spill buffer and pass them to higher level software. In some embodiments, the interrupt service routine processes data in the active buffer and the recovery routine only processes data in the spill buffer.

BRIEF DESCRIPTION OF THE DRAWINGS

For a better understanding of the present disclosure, reference is made to the accompanying drawings, in which like elements are referenced with like numerals, and in which.

DETAILED DESCRIPTION

This disclosure describes a system and method by which a host and a peripheral device communicate using the Universal Asynchronous Receive/Transmit (UART) protocol. The method is interrupt latency resilient. The system and method achieve this objective by utilizing a spill buffer that captures data that was transmitted by the host before the peripheral device was able to properly configured the DMA controller.

Figure 1:
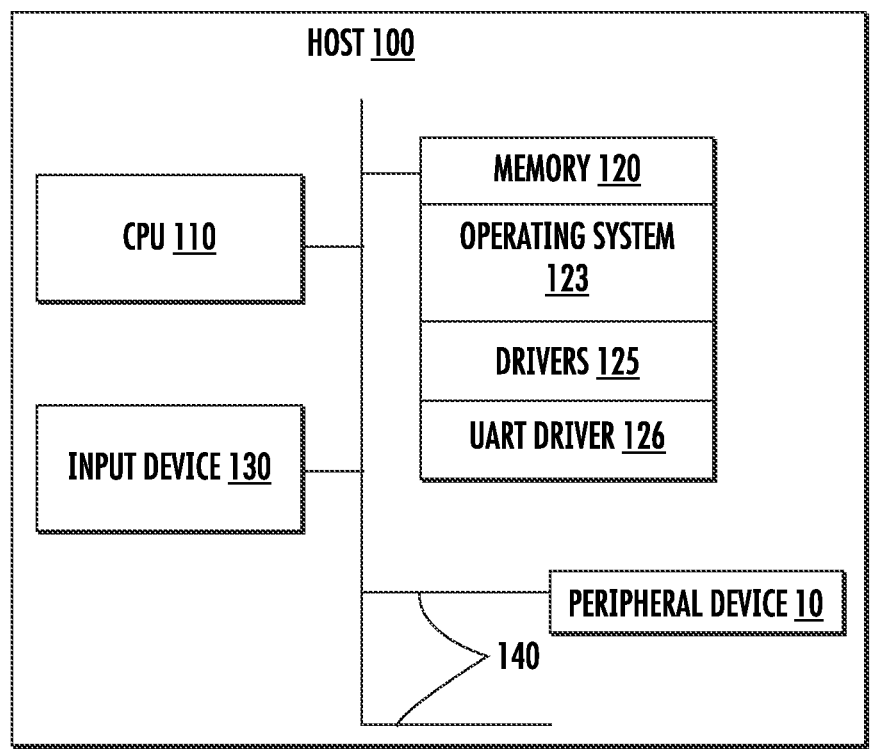
FIG. 1 shows the configuration of the host and peripheral device.

FIG. 1 shows an example configuration of a host 100 and a peripheral device 10. The host 100 may be a personal computer, server or other computing device. The host 100 includes a processing unit, such as a central processing unit (CPU) 110, and a memory device 120 that contains the instructions executed by the CPU. In addition, the host 100 may include other functionality, such as a graphics processor, an input device 130, a DMA controller and others. The host 100 may utilize any operating system 123, such as Windows®, Linux, iOS or others. In addition to an operating system 123, the host 100 contains additional software, referred to as drivers 125, that interact with various hardware components that are part of or are connected to the host 100. Typical drivers include video drivers, printer drivers, and others. The host 100 also includes a UART driver 126. The operating system 123 and the drivers 125 are instructions which are contained within the memory device 120. Additionally, the host 100 may include connectors 140 that allow for the insertion of peripheral components, such as peripheral device 10.

Figure 2:
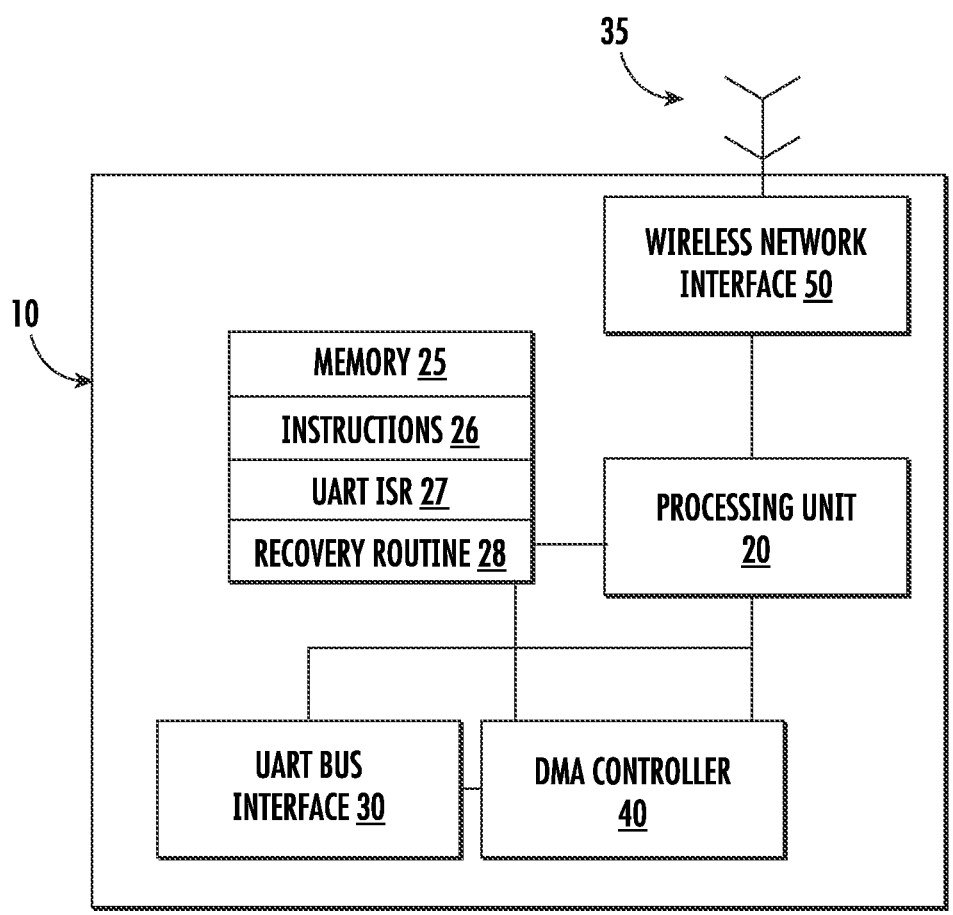
FIG. 2 shows a block diagram of a peripheral device according to one embodiment.

FIG. 2 shows a block diagram of a representative peripheral device 10 that may be used in conjunction with the UART driver 126 to achieve interrupt latency resilient communication between the host 100 and the peripheral device 10.

The peripheral device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the peripheral device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. Specifically, the instructions 26 include a UART interrupt service routine (ISR) 27 and a recovery routine 28, which is executed outside the interrupt context.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 2. The second computer readable non-transitory media may be a CDROM, or a different memory device, which is located remote from the peripheral device 10. The instructions contained on this second computer readable non-transitory media may be downloaded onto the memory device 25 to allow execution of the instructions by the peripheral device 10.

The peripheral device 10 also includes a UART bus interface 30 that connects with a UART interface located on the connector 140. The UART interface includes a transmit signal, and a receive signal.

The peripheral device 10 includes a direct memory access (DMA) controller 40, which may be a linking DMA controller, that allows data to be directly read from or written to the memory device 25. The DMA controller 40 operates through the use of descriptors. These descriptors, which are structures that are provided to the DMA controller 40, inform the DMA controller as to the memory address where the data is to be read from or written to, and the number of bytes of data that are associated with this transfer. Multiple descriptors are linked together such that the DMA controller 40 is able to execute a sophisticated set of steps without the need for CPU intervention.

The peripheral device 10 may include other functions as well. For example, in certain embodiments, the peripheral device 10 may include a wireless network interface 50 and an antenna 35 to enable wireless communications using Bluetooth, Zigbee or some other wireless protocol.

While the processing unit 20, the memory device 25, the UART bus interface 30, the wireless network interface 50 and the DMA controller 40 are shown in FIG. 2 as separate components, it is understood that some or all of these components may be integrated into a single electronic component. Rather, FIG. 2 is used to illustrate the functionality of the peripheral device 10, not its physical configuration.

A traditional UART transmission includes a header and optionally a payload. The header, which may be a HDLC header, may be fixed in length and include a byte count that indicates the number of bytes that will be contained in the payload. The header may also include an error detecting code. The host transmits bits to the peripheral device. Note that the peripheral device 10 cannot affect the flow of information from the host to the peripheral device.

As noted above, there are potential issues with these transactions. Specifically, in the case of a host initiated transfer, the peripheral device 10 needs to configure the DMA controller 40 to receive the proper number of bytes of payload, which was defined in the header. If the host 100 begins transmitting the payload before the DMA controller 40 is configured, data may be lost.

The present disclosure addresses this issue by using a spill buffer to capture data that was transmitted by the host before the peripheral device was able to configure the DMA controller 40. The peripheral device then utilizes a recovery routine 28, which is a software program resident on the peripheral device 10, to parse the spill buffer for headers and payloads. This recovery routine does not operate during an interrupt.

Figure 3:
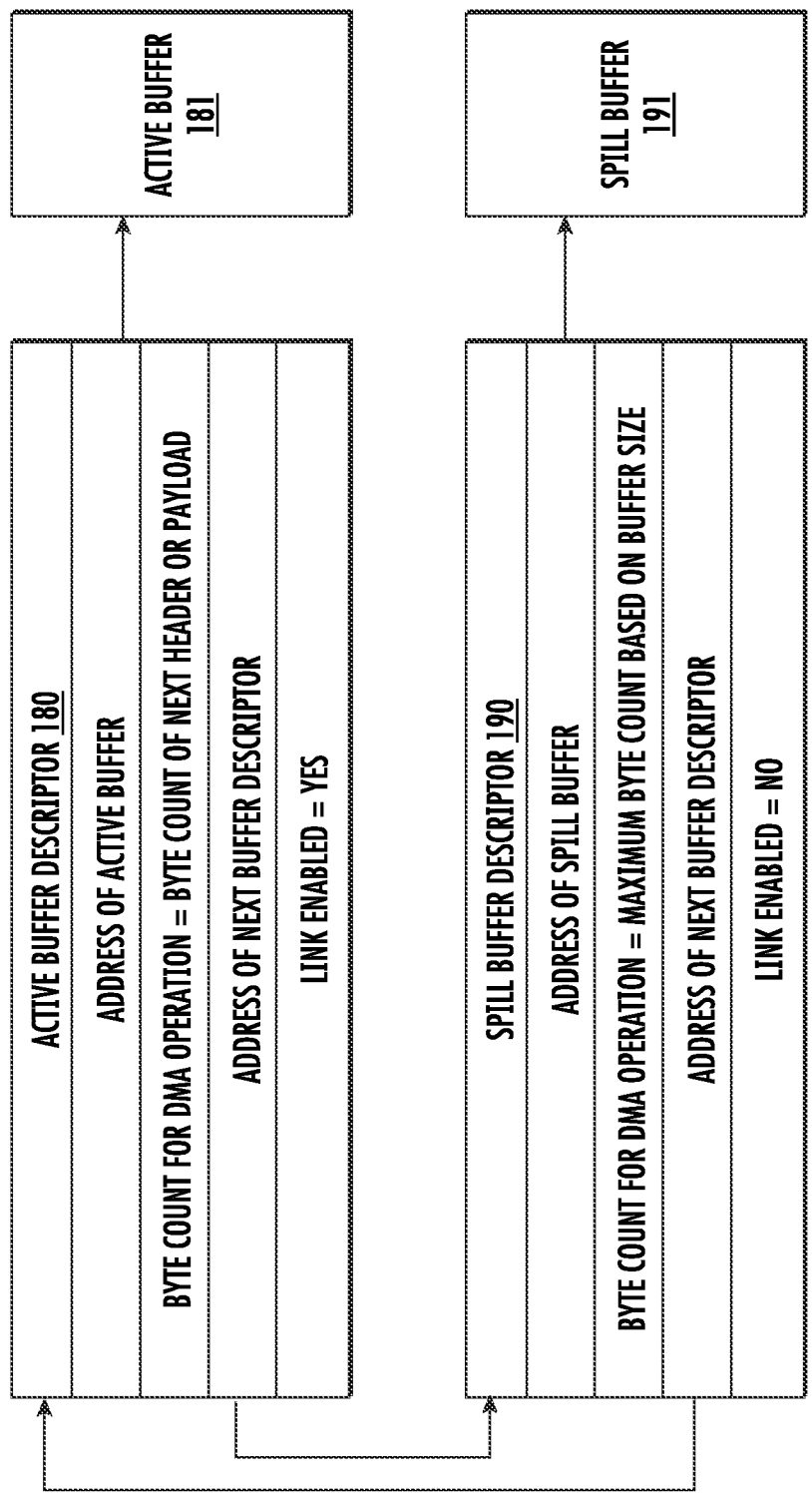
FIG. 3 shows the configuration of the buffer descriptors.

The peripheral device 10 utilizes two buffer descriptors; the first is referred to as the active buffer descriptor 180 and a second which is referred to as the spill buffer descriptor 190. Buffer descriptors are used to define the operation to be performed by the DMA controller 40. These descriptors include a byte count and a starting address. These descriptors also include a link to the next buffer descriptor to use when the operation associated with the current buffer descriptor is completed. These buffer descriptors may also include a link enable flag, which indicates whether to move to the next buffer descriptor. FIG. 3 shows one representation of the buffer descriptors and the associated buffers.

In normal operation, the active buffer 181 is used to capture an incoming header or payload because the active buffer descriptor 180 has been configured with the proper number of bytes. Importantly, the active buffer descriptor 180 is linked to a spill buffer descriptor 190, which defines the spill buffer 191 that is used to capture any information transmitted by the host before the peripheral device 10 can configure the next active buffer descriptor 180. To maximize the amount of spilled data that can be accommodated, the spill buffer descriptor 190 may include a byte count that is equal to the size of the spill buffer 191. In some embodiments, this may be at least 2 kBytes, although other sizes may be used.

As noted above, the instructions 26 include an interrupt service routine (ISR) 27 and a recovery routine 28. The ISR 27 is invoked anytime an interrupt is generated by the DMA controller 40. Note that the DMA controller 40 generates an interrupt whenever the number of bytes defined in the active buffer descriptor 180 have been received.

Figure 4:
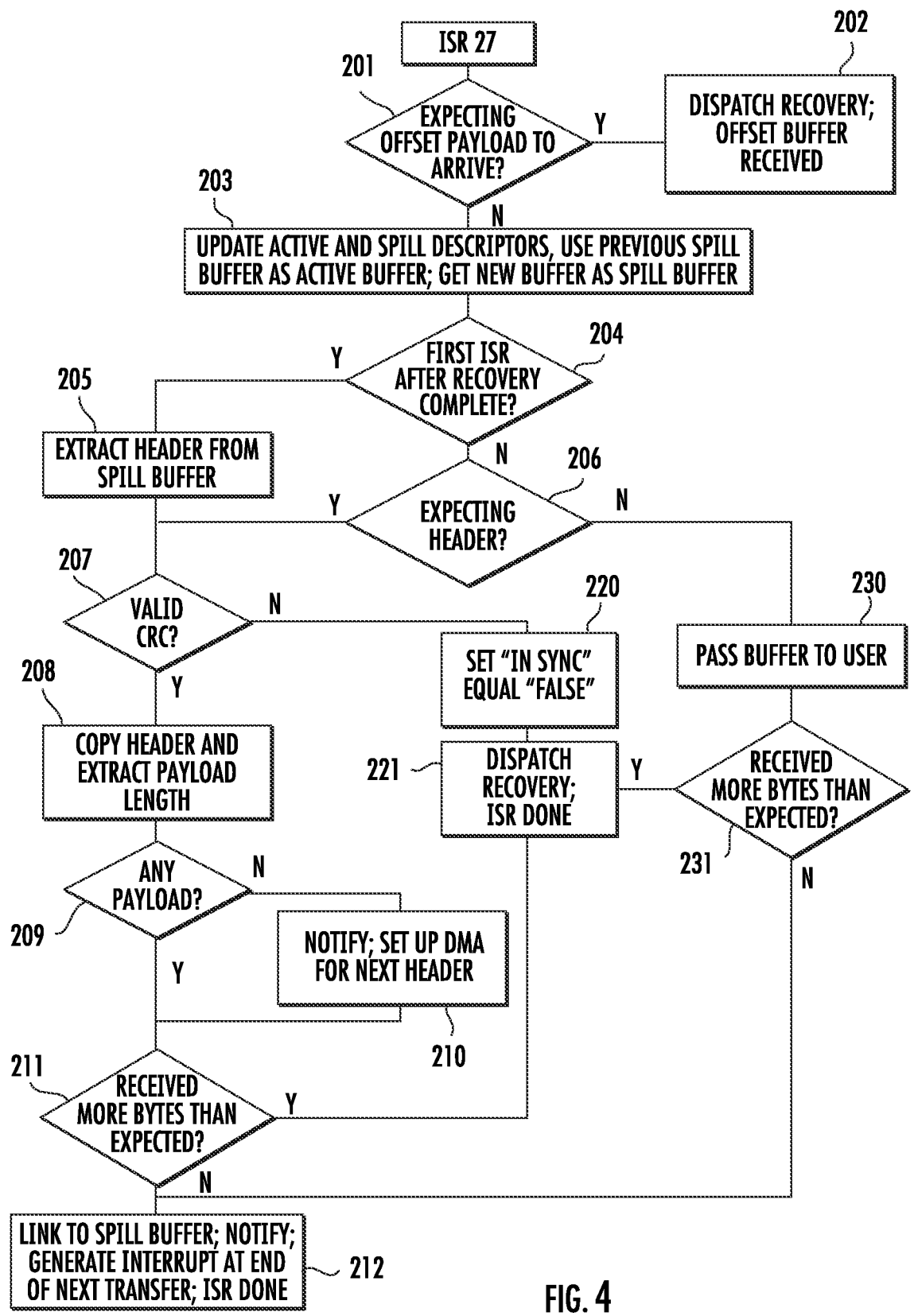
FIG. 4 is a flowchart illustrating the operation of the interrupt service routine in one embodiment.

FIG. 4 shows the operations performed by the processing unit 20 whenever an interrupt is received from the DMA controller 40. For simplicity, the normal operation of the ISR 27 will be described first.

Assume that the active buffer descriptor 180 was previously configured to receive a header. In this case, the active buffer descriptor 180 may have included a byte count of 7 bytes, which is the length of the header in some embodiments. After the seventh byte has been received, the DMA controller 40 provides an interrupt to the processing unit 20. In response, the ISR 27 is executed. In this scenario, the Decision Boxes 201 and 204 are both false. Thus, the processing unit 20 first sets the spill buffer descriptor 190 as the active buffer descriptor 180 and the current active buffer descriptor as the spill buffer descriptor 190. The current spill buffer becomes the active buffer 181. Further, a new spill buffer 191 is retrieved from a pool of free buffers.

Since a header is expected, the processing unit 20 executes Decision Boxes 206 and 207. The processing unit 20 then checks the CRC of the header. If the header is not valid, then the byte count included in the header cannot be trusted, and the processing unit 20 assumes that it no longer knows when the next header will occur. This situation is referred to as a loss of synchronization. Therefore, the variable "in sync" is set to false, and the recovery routine 28 will be dispatched, as shown in Boxes 220 and 221. However, if the CRC is valid, the processing unit 20 copies the header and extracts the payload length from the header as shown in Box 208. Note that in some embodiments, a header may not be accompanied by the payload. In this scenario, another header will immediately follow a header. If there is a payload, then the payload will follow the header. To distinguish between these two scenarios, the processing unit 20 checks if the byte count of the payload (as found in the header) is non-zero, as shown in Decision Box 209. If there is no payload, the processing unit 20 notifies the upper level software that a new header has been received as shown in Box 210. The processing unit 20 also sets up the active buffer descriptor 180 to receive the next header, which may be 7 bytes. If there is a payload, the processing unit 20 configures the DMA controller 40 to receive the number of bytes in the payload. In both scenarios, the processing unit 20 links the active buffer descriptor 180 to the spill buffer descriptor 190, as shown in Box 212. At this point, the interrupt service routine is complete.

At a later time, the payload will be received and another interrupt will be generated. In this scenario, the processing unit 20 will execute Box 203 as described above, but will now execute Box 230, where the active buffer, which contains the payload, is passed to the higher level software. The DMA controller 40 is then updated to indicate that a header is expected next, so the byte count of a header is written to the DMA controller 40. The spill buffer is then linked to the active buffer and the ISR is complete, as shown in Box 212.

As noted above, in some embodiments, the interrupt latency is such that the ISR 27 does not execute immediately after the interrupt signal is asserted. In this situation, additional bytes (beyond those which were expected) may have been received. This condition is recognized by the ISR 27 as explained below.

Assume first a scenario where the processing unit 20 expected that a header was received. However, in addition to that header, more bytes were received. These additional bytes may be the payload associated with that header, or may be another header in the scenario where the received header did not include a payload. In this scenario, the processing unit 20 executes many of the steps described above related to receipt of a header. However, in this scenario, the processing unit 20 detects that more bytes were received than expected (see Decision Box 211). This indicates that some additional information has been written to the spill buffer 191. Note that once the header was received, the DMA controller 40 is done with the active buffer descriptor 180 and links to the spill buffer descriptor 190. Therefore, these additional bytes are written to the spill buffer 191. At this point, the processing unit 20 dispatches the recovery routine 28, and the interrupt service routine 27 is complete, as shown in Box 221. Note that the processing unit 20 does not attempt to address this issue within the interrupt service routine 27.

Assume now that the processing unit 20 expected that a payload was received. However, in addition to that payload, more bytes were received. These additional bytes may be another header (and its associated payload). In this scenario, the processing unit 20 executes many of the steps described above related to receipt of a payload. However, in this scenario, the processing unit 20 detects that more bytes were received than expected (see Decision Box 231). Thus, as described above with respect to Box 221, the recovery routine 28 is dispatched.

Thus, the ISR 27 either terminates with success, where the next transfer is set up in the DMA controller 40, or it terminates by dispatching the recovery routine 28. Decision Boxes 201 and 204 will be described later, following a description of the recovery routine 28.

Figure 5A:
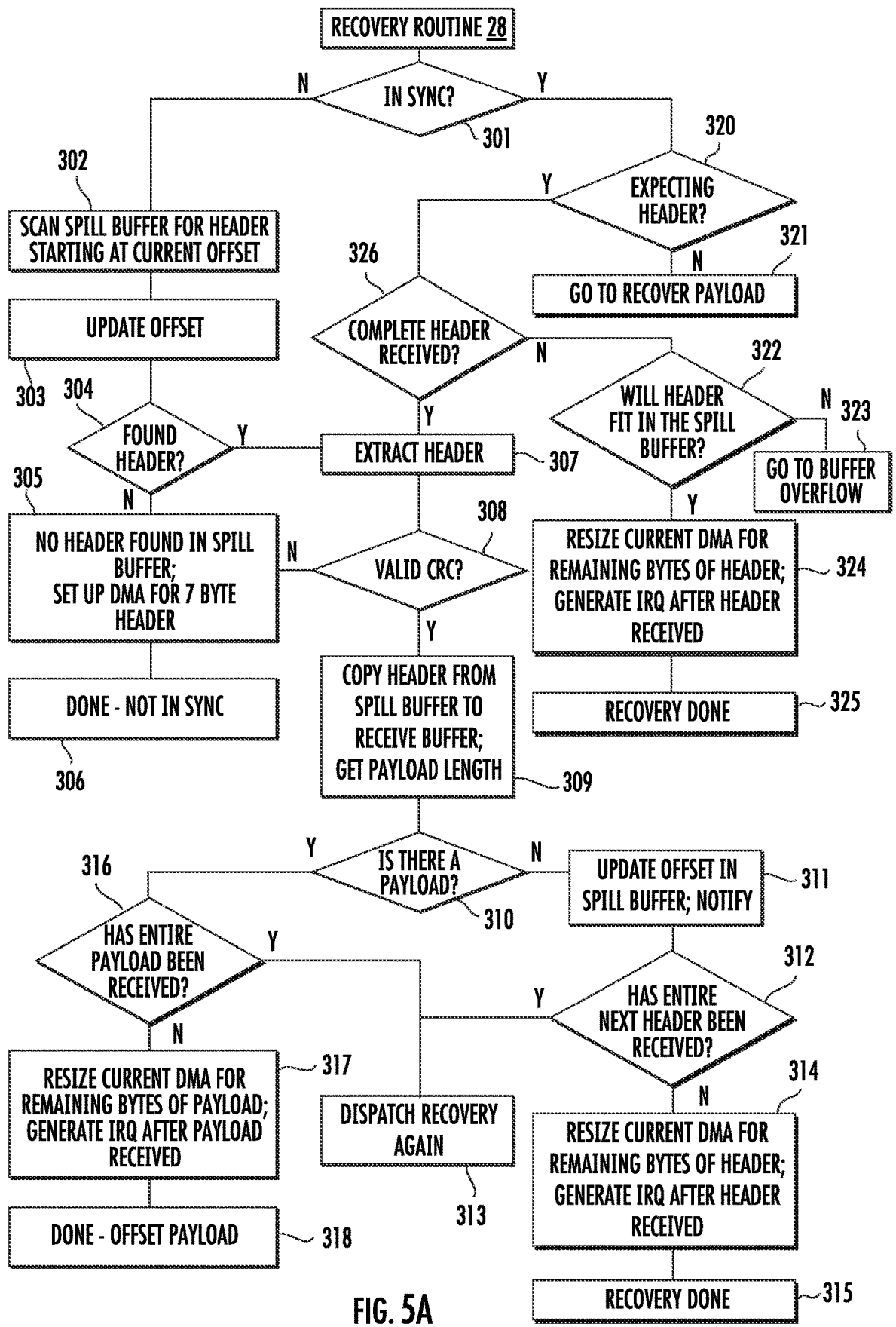
FIGS. 5A-5C are a flowchart showing the operation of the recovery routine according to one embodiment.
Figure 5B:
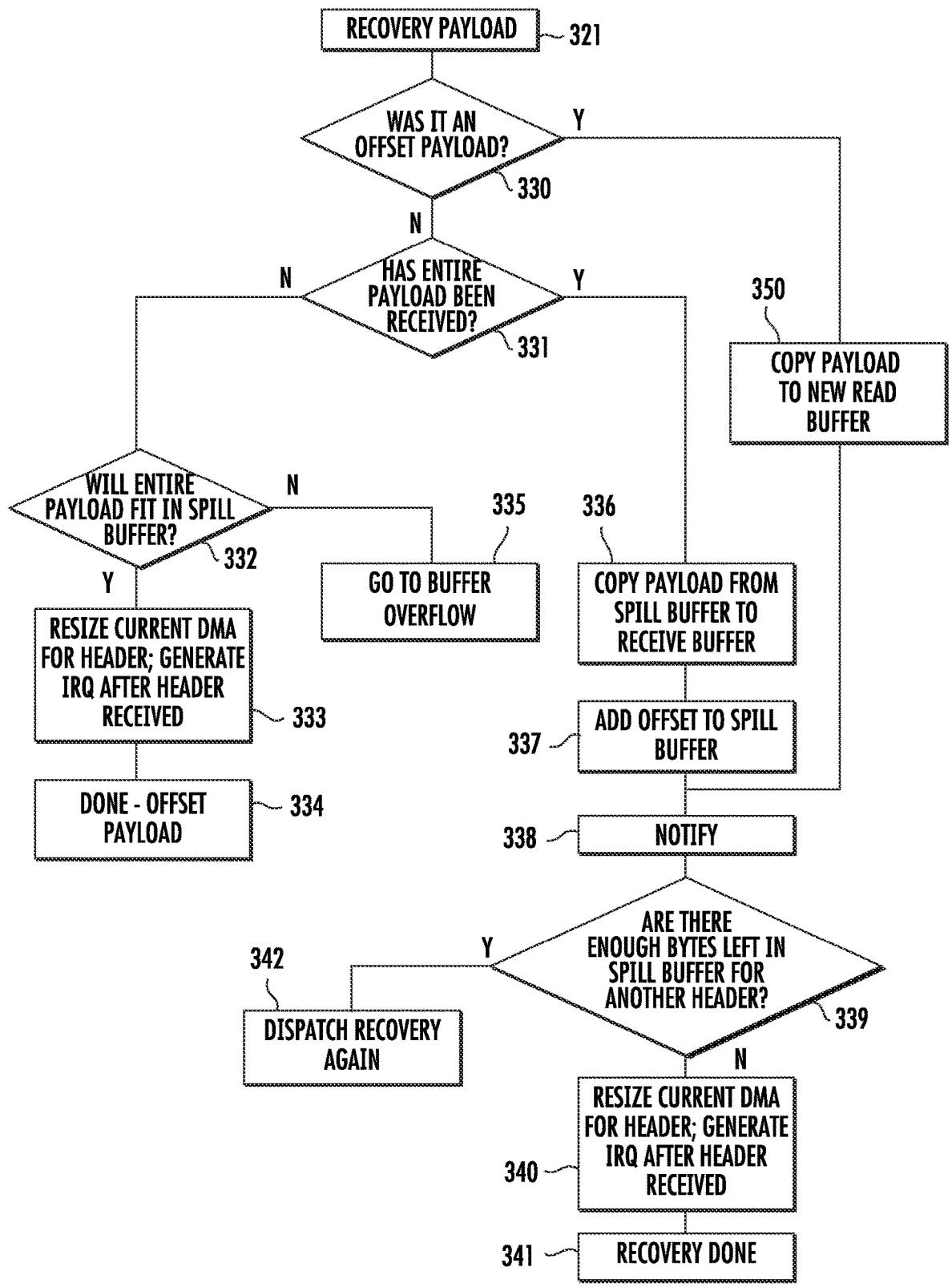
Figure 5C:
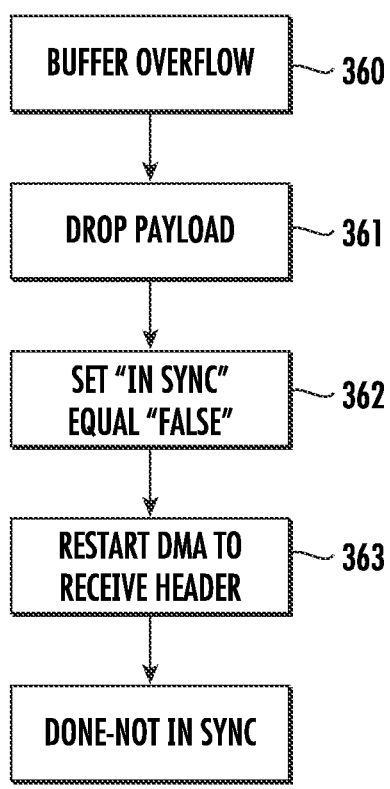

FIGS. 5A-5C shows the operation of the recovery routine 28. As noted above, this recovery routine 28 is dispatched when the ISR 27 detects that more bytes arrived than were expected, such that there are now bytes located in the spill buffer. The objective of the recovery routine is to extract all of the headers and payloads that were written to the spill buffer in an organized manner.

Returning first to the scenario where the processing unit 20 expected that a header was received; however, in addition to that header, more bytes were received. These additional bytes may be the payload associated with that header, or may be another header in the scenario where the received header did not include a payload. Additionally, there may be more than one payload and/or header in the spill buffer. As described above, in each of these scenarios, the ISR 27 terminates by dispatching the recovery routine (see Box 221).

Since the peripheral device 10 is in sync, the processing unit 20 moves to Decision Box 320. Assuming that the previous header had no payload, the peripheral device 10 will be expecting a header and will move to Decision Box 326. At this point, the processing unit 20 checks how many bytes have been received in the spill buffer 191.

There are two options, either an entire header has been received, or it has not. If the entire header has not yet been received, then the processing unit 20 is almost caught up to the incoming data. The processing unit 20 checks if the rest of the header will fit in the spill buffer 191 (see Decision Box 322). If so, the DMA controller is reconfigured to receive the remaining bytes of the header and to generate an interrupt after the header has been received, as shown in Box 324. In this scenario, the recovery process is now complete, as the next interrupt will be generated when this entire header arrives. The scenario in which the header will not fit in the spill buffer, which occurs when there are many headers and payloads already in the spill buffer 191, is referred to as Buffer Overflow (see Box 323) and will be described later.

As noted above, the second option is that the entire header has already been received. In this case, the recovery routine must extract the header (see Box 307) and check if there is a valid CRC (Decision Box 308). Assuming that the CRC is valid, the processing unit 20 copies the header to a buffer to pass to higher level software. It also determines the size of the payload associated with this header, as shown in Box 309. If there is no payload associated with this header, then the processing unit 20 knows that the next segment received will be another header. In this scenario, as shown in Box 311, the processing unit 20 updates the offset in the spill buffer 191. This offset is used by the recovery routine 28 to track how much of the contents of the spill buffer 191 has already been parsed. The higher level software is then notified that a header was received.

In certain embodiments, the recovery routine continues by checking whether the entirety of the next header has been received. If it has not, the recovery routine has processed all of the information in the spill buffer 191. Therefore, the processing unit 20 updates the DMA controller 40 with the remaining length of the next header, which will cause an interrupt upon completion, as shown in Box 314. At this point, the recovery process is complete, as all of the data in the spill buffer 191 has been processed. If however, the entire header has been received, there is more information in the spill buffer 191 that must be processed. Thus, in this scenario, the recovery routine is dispatched again, as shown in Box 313. Note that in another embodiment, rather than dispatching the recovery routine again, the processing unit 20 may return to Box 307 and proceed from there.

Note that the scenario above assumed that the header than was being processed did not include a payload. However, in some cases, a payload will follow that header. Thus, in this scenario, the processing unit 20 checks if there is a payload, as shown in Decision Box 310. In this scenario, the processing unit 20 checks if the entire payload has been received, as shown in Decision Box 316. If it has been received, there is more information in the spill buffer 191 to process, and the processing unit 20 dispatches the recovery routine again, as shown in Box 313. Alternatively, the processing unit may choose to process that payload by returning to Box 321. If the entire payload has not been received, the processing unit 20 will configure the DMA controller for the remaining bytes of the payload, as shown in Box 317. This will cause an interrupt to be generated when the entire payload has been delivered. This situation is referred to as an offset payload, since it is a payload that does not begin at the start of the spill buffer 191. At this time, the recovery routine is complete, as shown in Box 318.

Note that in the situation where there is an offset payload, there is a special path in the ISR 27. Returning to FIG. 4, note that if an offset payload is expected to arrive (see Decision Box 201), the ISR 27 simply dispatches the recovery routine and does not perform any other functions, as shown in Box 202.

The disclosure above describes the operation of the recovery routine 28 when it expects to receive a header. As noted above, this may occur as a result of exiting the ISR 27 where an additional header has already started being received, as demonstrated by the path including Decision Box 209, Box 210, Decision Box 211 and Box 221, as well as the path in the ISR 27 that included Box 230, Decision Box 231 and Box 221. It may also occur if the recovery routine is dispatched a second time when the previous recovery routine exited via the path defined by Decision Box 312 and Box 313. This may also occur via the path defined by Decision Box 339 and Box 342, which will be described later.

However, there are also scenarios where the recovery routine will be executed when a payload is expected. One such scenario was described with respect to the path in the ISR 27 that included Decision Box 209, Decision Box 211 and Box 221. Another path in the ISR 27 includes Decision Box 201 and Box 202.

The execution of the recovery routine 28 when a payload is expected will now be described. First, as shown in Decision Box 320, a header is not expected, so the processing unit 20 moves to Recovery Payload, which is shown in FIG. 5B. Note that this part of the recovery routine 28 may be entered either through the path in the ISR 27 or through the path in the recovery routine 28. Note that if this part of the recovery routine is entered from the path in the ISR 27 that included Decision Boxes 209 and 211 and Box 221, the payload will be at the beginning of the spill buffer. However, if it is entered via the path in the ISR 27 that included Decision Box 201 and Box 202, the payload will not be at the start of the spill buffer. Decision Box 330 distinguishes between these two conditions.

If an offset payload has arrived, the payload is copied to a new read buffer, as shown in Box 350. The processing unit 20 then notifies the higher level software of the receipt of this payload, as shown in Box 338. The processing unit 20 then checks if there are additional bytes left in the spill buffer that are enough to represent the next header, as shown in Decision Box 339. If there are not, the recovery routine has caught up to the host, and the processing unit 20 configures the DMA controller 40 to receive the rest of the header and to generate an interrupt thereafter, as shown in Box 340. At this point, the recovery routine is done, as shown in Box 341. If, however, there are enough bytes left in the spill buffer 191 to include another header, the processing unit 20 may dispatch the recovery routine again, as shown in Box 342. Note that instead of dispatching the recovery routine again, the processing unit may jump to Box 308 on FIG. 5A.

Returning to Decision Box 330, if this is not an offset payload, the processing unit 20 proceeds to Decision Box 331. If the entire payload has been received, the processing unit 20 copies the payload from the spill buffer to a receive buffer, as shown in Box 336. The offset is adjusted to account for this payload, as shown in Box 337. The processing unit 20 then notifies the higher level software and checks if another header is being received into the spill buffer, as described above and shown in Boxes 339-342.

Returning to Decision Box 331, if the entire payload has not yet been received, the processing unit 20 checks if the entire payload will fit in the spill buffer 191, as shown in Decision Box 332. If it will not, which occurs when there are many headers and payloads already in the spill buffer 191, this is referred to as Buffer Overflow (see Box 335) and will be described later. If the payload will fit in the spill buffer 191, the processing unit 20 configures the DMA controller 40 to receive the remaining bytes of the payload and to generate an interrupt thereafter, as shown in Box 333. This will result in an offset payload, where the payload does not begin at the start of the spill buffer 191, as indicated in Box 334.

Returning to FIG. 4, it can be seen that Decision Box 204 checks if this is the first ISR after the recovery has completed. Note that recovery is considered complete when all of the information that was written to the spill buffer 191 has been processed, and only occurs at Boxes 315, 325 and 341.

In each of these cases, the header is located in the spill buffer. Thus, if this is the first ISR after the recovery is complete, there will be a complete header in the spill buffer 191. The processing unit 20 extracts this header from the spill buffer, as shown in Box 205. It then processes this header as described above and shown in Boxes 207-211 and 220-221.

Another possible scenario is that the CRC for the header is not valid. In this case, the length of the payload as defined in the header cannot be trusted. Thus, in this case, the processing unit 20 ignores all incoming data until it recognizes another header. This is shown in the recovery routine in FIG. 5A. First, the processing unit 20 detects that the peripheral device 10 is not in synchronization with the host as shown in Decision Box 301. The processing unit 20 then scans the spill buffer 191 looking for bytes that it recognizes as a header, as shown in Box 302. This scanning continues until either a header is found or the end of the spill buffer 191 is reached. The processing unit 20 then updates the offset in the spill buffer so that it is aware of what was already processed, as shown in Box 303. If a header is found, (see Decision Box 304) the processing unit 20 extracts the header and then performs the sequence used upon receipt of a header, as described above and shown in Boxes 308-318. If however, no header is found, or the CRC of a found header is invalid, then the peripheral device 10 is still not in synchronization with the host 100. In this case, the processing unit configures the DMA controller 40 to receive a predetermined number of bytes, which may be equal to the number of bytes in a header, as shown in Box 305. This will generate an interrupt after this predetermined number of bytes are received and the recovery routine is done as shown in Box 306. The processing unit 20 will then repeat this sequence until it eventually finds a header with a valid CRC.

Lastly, in FIGS. 5A-5B, there are situations where the spill buffer may overflow. This is due to the fact that the host 100 transmitted more data than could be held in the spill buffer 191. As a result, some data is lost. This situation is shown in Box 323 in FIG. 5A and in Box 335 in FIG. 5B. FIG. 5C shows the operation of the recovery routine 28 when a buffer overflow occurs. First, as shown in Box 361, the payload (or header) is dropped, as it is complete. Because of this, the peripheral device 10 has now lost synchronization with the host 100, and therefore, the "in sync" variable is set to false, as shown in Box 362. The processing unit 20 then configures the DMA controller 40 to receive a predetermined number of bytes in an attempt to find a valid header. This part of the recovery routine 28 is now complete, and subsequently, the operations shown in Boxes 302-305 will be executed after each interrupt until a valid header is found.

Note that, depending on the size of the spill buffer, the likelihood of buffer overflows may be small. However, the likelihood of buffer overflows may be further reduced. For example, in one embodiment, the size of the spill buffer 191 may be made larger so as to allow longer interrupt latency delays. In another embodiment, the spill buffer descriptor 190 may be linked to a secondary spill buffer, which serves to capture any data after the spill buffer has been completely filled.

While this disclosure describes the use of spill buffers and recovery routines in the context of a UART bus, it is understood that this approach is equally applicable to any bus protocol that does not support flow control.

This system and method has many advantages. In prior art embodiments, the maximum baud rate of the host was limited in an attempt to reduce the likelihood that the host would transmit data before the peripheral device 10 had properly configured the DMA controller 40. This reduced, but did not eliminate, the likelihood of lost data. By utilizing a spill buffer and a recovery routine, it is possible to increase the baud rate by an order of magnitude while also reducing the likelihood of lost data. This allows higher bandwidth and also tolerates the peripheral device to incur longer interrupt latency times without loss of data.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A peripheral device to receive data from a host with no flow control, wherein the data comprises a plurality of headers and payloads, the peripheral device comprising:
   a processing unit;
   a memory device; and
   a direct memory access (DMA) controller,
   wherein the peripheral device configures the DMA controller to receive a header or a payload, uses an active buffer disposed in the memory device to store the header or payload sent to the peripheral device, and uses a spill buffer to capture additional headers and payloads transmitted before the DMA controller is properly configured to receive the additional headers and payloads, and wherein the peripheral device uses an interrupt service routine to process the header or the payload received in the active buffer, and executes a recovery routine, different from the interrupt service routine, when data is written to the spill buffer by the DMA controller, to extract the additional headers and/or payloads in the spill buffer and pass them to higher level software.

2. The peripheral device of claim 1, wherein the DMA controller comprises a linking DMA controller, such that there are a plurality of buffer descriptors disposed in the memory device, each buffer descriptor comprising an address of a buffer to store received data, a byte count and an address of a next buffer descriptor to use when the DMA controller has received a number of bytes equal to the byte count.

3. The peripheral device of claim 2, wherein an active buffer descriptor is used by the peripheral device to identify the active buffer, and wherein the active buffer descriptor comprises an address of a spill buffer descriptor as the address of the next buffer descriptor, and wherein the spill buffer descriptor comprises the address of the spill buffer.

4. The peripheral device of claim 2, wherein the peripheral device executes the interrupt service routine after the DMA controller receives the number of bytes defined in the byte count.

5. The peripheral device of claim 4, wherein the header comprises a cyclic redundancy check (CRC) and a length field that defines a length of an associated payload; wherein the interrupt service routine, after receiving the header, checks a validity of the CRC, and if valid, configures the DMA controller to receive a payload having a number of bytes defined in the length field.

6. The peripheral device of claim 5, wherein the interrupt service routine, after receiving the payload, passes the active buffer to higher level software, and configures the DMA controller to receive a next header.

7. The peripheral device of claim 6, wherein the interrupt service routine, after receiving the header or the payload, checks if additional data has been received, and if so, dispatches the recovery routine.

8. The peripheral device of claim 1, wherein the recovery routine only processes data in the spill buffer.

9. A method of receiving data with no flow control, wherein the data comprises a plurality of headers and payloads, using a direct memory access (DMA) controller, the method comprising:
   configuring the DMA controller to receive a header or a payload and using an active buffer to store the header or payload;
   using a spill buffer to capture additional headers and payloads transmitted before the DMA controller is properly configured to receive the additional headers and payloads;
   using an interrupt service routine to process the header or payload received in the active buffer; and
   executing a recovery routine, different from the interrupt service routine, when data is written to the spill buffer by the DMA controller, to extract the additional headers and/or payloads in the spill buffer and pass them to higher level software.

10. The method of claim 9, wherein the DMA controller comprises a linking DMA controller, such that there are a plurality of buffer descriptors, each buffer descriptor comprising an address of a buffer to store received data, a byte count and an address of a next buffer descriptor to use when the DMA controller has received a number of bytes equal to the byte count.

11. The method of claim 10, wherein an active buffer descriptor is used to identify the active buffer, and wherein the active buffer descriptor comprises an address of a spill buffer descriptor as the address of the next buffer descriptor, and wherein the spill buffer descriptor comprises the address of the spill buffer.

12. The method of claim 10, wherein the interrupt service routine is executed after the DMA controller receives the number of bytes defined in the byte count.

13. The method of claim 12, wherein the header comprises a cyclic redundancy check (CRC) and a length field that defines a length of an associated payload; wherein the interrupt service routine, after receiving the header, checks a validity of the CRC, and if valid, configures the DMA controller to receive a payload having a number of bytes defined in the length field.

14. The method of claim 13, wherein the interrupt service routine, after receiving the payload, passes the active buffer to higher level software, and configures the DMA controller to receive a next header.

15. The method of claim 14, wherein the interrupt service routine, after receiving the header or payload, checks if additional data has been received, and if so, dispatches the recovery routine.

16. The method of claim 9, wherein the recovery routine only processes data in the spill buffer.

\* \* \* \* \*